United States Patent [19]
Farley

[11] Patent Number: 5,582,928
[45] Date of Patent: Dec. 10, 1996

[54] SUPPLY BATTERIES

[75] Inventor: Joseph Farley, Villeneuve Loubet, France

[73] Assignee: Texas Instruments Incorporated, Dallas, Tex.

[21] Appl. No.: 366,710

[22] Filed: Dec. 30, 1994

[51] Int. Cl.$^6$ ............... H01M 14/00; H01M 10/44; H02J 7/00
[52] U.S. Cl. ................ 429/7; 429/61; 429/62; 320/22; 320/35; 320/48
[58] Field of Search ............... 429/7, 61, 62; 320/22, 35, 48

[56] References Cited

U.S. PATENT DOCUMENTS

| | | | |
|---|---|---|---|
| 4,645,996 | 2/1987 | Toops | 320/2 |
| 5,200,686 | 4/1993 | Lee | 320/2 |

*Primary Examiner*—Stephen Kalafut
*Assistant Examiner*—Richard H. Lilley, Jr.
*Attorney, Agent, or Firm*—David S. Guttman; Richard L. Donaldson

[57] ABSTRACT

The present invention relates to a supply battery arrangement having 3 terminals, for example a battery for a video camera recorder. This arrangement permits employing the battery both as an intelligent battery and as a non-intelligent battery capable of operating normally on devices of the standard video camera recorder type and also capable of communicating with a equipment or an intelligent device and displaying the state of charge with no additional terminals. The battery arrangement comprises a negative terminal (24) and a positive terminal (22) for supplying the equipment or the device with a voltage coming from the battery, a universal "T" terminal (26) operating as a thermal measuring means and a data terminal or a charge control output when it is employed by a computer, a charger or some other intelligent equipment or device.

1 Claim, 1 Drawing Sheet

SUPPLY BATTERIES

FIELD OF THE INVENTION

The present invention concerns improvements in or relating to supply batteries, particularly rechargeable supply batteries which may be employed in both intelligent devices and non-intelligent devices. Intelligent devices comprise those capable of transmitting or receiving digital data, controlling parameters of the battery, etc.

DESCRIPTION OF THE PRIOR ART

It is known to provide many devices with supply batteries. A particular application in which a supply battery is necessary is a device which is a hand-held or portable device. Portable video cameras or video camera recorders, such as those the most widely known, generally have a supply battery. This supply battery is employed for supplying power to the device and is replaced when the voltage of the battery drops below the threshold value representing the lower state of the safety charge limit for the operation of the device and for the long life of the cells. A warning signal is usually produced by the device when the battery reaches this threshold. The operator then withdraws the discharged supply battery, recharges it and puts it back into the device (or places another charged supply battery in the device). The images recorded on the video tape are unaffected if the state of charge of the supply battery drops below a level at which the camera ceases to operate. Other devices exist, such as for example radio apparatuses, portable television sets, portable telephones and the like in which the loss of power of the battery does not affect the device or any stored information relating to the device.

Some devices supplied by a battery are much more sensitive to losses or drops in the power of the battery. Such devices comprise portable computers or other intelligent devices. It is therefore essential that the computer check the state of charge of the supply battery so as to ensure that there is always sufficient power to be applied during normal use by the computer. For this purpose, supply batteries now include an intelligent device which calculates their state of charge with precision and comprises a data bus through which they are able to communicate to the computer this state of charge and other data, for example, the temperature of the cells, the voltage, the present capacity and the history of utilization. This enables the computer to monitor the state of charge of the supply battery and detect the moment when a drop in power of the battery occurs and inform the user of the situation so as to stop operations at the opportune moment and take the necessary precautions to ensure that the information and the data stored in its volatile memory are not lost. Further, by adding LEDS and liquid crystal display modules to the supply battery, the information concerning the state of charge (or other state) can be displayed, even when the device is out of service. For this purpose, it is therefore currently necessary to provide an "intelligent supply battery" for a computer and similar applications and a "non-intelligent supply battery" for applications not intended for digital communication with the supply battery. This means that if the user has several different types of devices he will need different supply batteries for each of these devices. This of course increases the cost for the user since he will need two supply batteries. It will also become expensive for the manufacturer of the supply battery and for the manufacturer of the final equipment to employ an existing standard format of a supply battery of large size.

The majority of video camera recorders employ standard video supply batteries having 3 output prongs; examples of the latter are the "Sony" and "Panasonic" arrangements. These supply batteries are produced in very large numbers. They comprise the following terminals, the positive terminal (+) and the negative terminal (−) which supply the devices and the "T" terminal which constitutes a means for measuring the temperature of the cells. The "T" terminal is connected to a component such as a thermistor whose resistance varies in the known manner with increasing and decreasing temperatures, this resistance being for example 10 k at 25° C. FIG. 1 is a diagram of a supply battery comprising this temperature terminal. The supply battery 10 comprises a positive terminal 12, a negative terminal 14 and the temperature terminal 16. The positive and negative terminals are respectively connected to the positive and negative terminals of the battery, and a thermal protection switch 19 is provided in the path of the current and is locally adjacent to the cells 18 of the battery alongside the temperature measuring device, for example a thermistor 20, connected to the "T" terminal 16 of the battery.

An object of the present invention is to provide a supply battery which may be employed with both intelligent devices and non-intelligent devices. This enables the user to exchange the supply battery between one device and another.

SUMMARY OF THE INVENTION

According to one aspect of the present invention, there is provided an arrangement of a supply battery comprising switching means for switching the operation of the supply battery from one mode to another in response to an exterior signal delivered by the equipment supplied with power by the supply battery.

The supply battery of the present invention may be exchanged between intelligent and non-intelligent devices and may identify which is the particular device connected at any moment through the universal "T" terminal.

BRIEF DESCRIPTION OF THE DRAWINGS

Reference will now be made by way of example to the accompanying drawings, in which.

DESCRIPTION OF THE PREFERRED EMBODIMENTS

Figure 1:
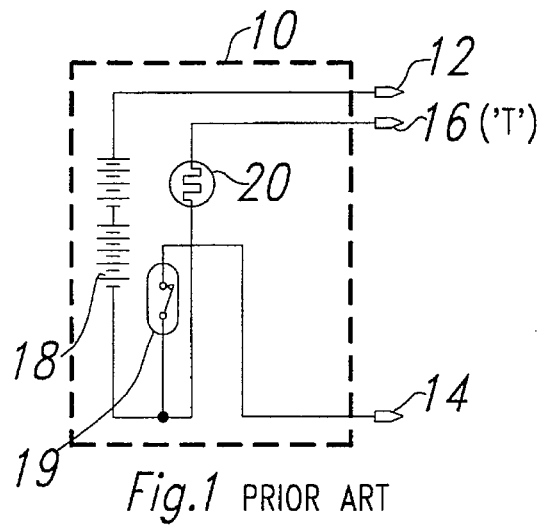
FIG. 1 is a circuit diagram of a supply battery of the prior art.
Figure 2:
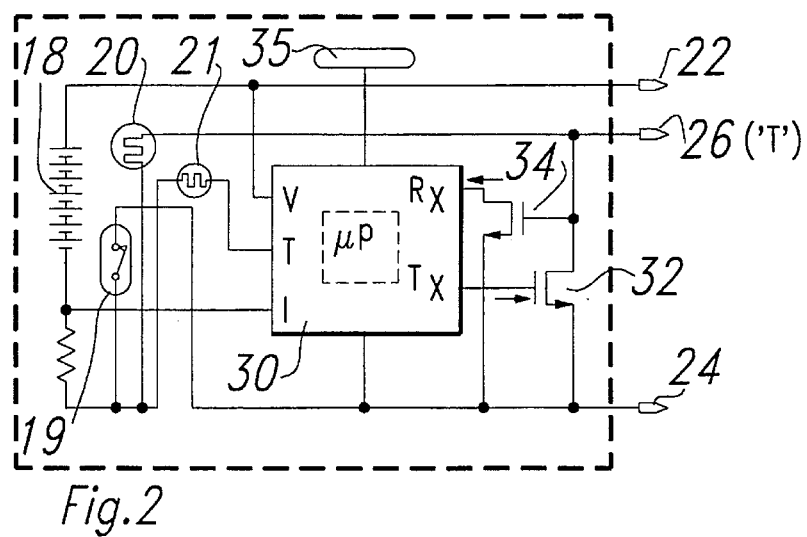
FIG. 2 is a circuit diagram of a first embodiment of the present invention.

Shown in FIG. 2 is a circuit diagram of an embodiment of the present invention. The supply battery may have any suitable shape and dimensions for connection, when used with the device it is intended to supply or with a battery charger for facilitating the charging of the cells. The cells of the battery and their associated circuit are enclosed in a case (not shown). The case is generally so shaped as to conform to the device with which it is to be employed. Three terminals are located outside the case of the supply battery. They are illustrated in FIG. 2 and comprise a positive terminal 22, a negative terminal 24 and a universal third terminal 26. The details of the terminal 26 will be described hereinafter. The terminals are so oriented that, when the supply battery is connected to the device to be supplied or to the battery charger, the terminals are in electrical and physical contact with one another. The internal circuit of the supply battery is also illustrated in FIG. 2. The cells 18 are arranged in series and/or in parallel so that a given voltage is applied by the supply battery.

The universal terminal 26 is capable of operating in a first mode when it is connected to a first type of equipment and capable of operating in a second mode when it is connected to a second type of equipment and may change from the first mode to the second mode in response to a signal generated by one of the types of equipment.

The first type of equipment is intelligent and produces said signal and in the first mode the universal terminal 26 acts as a data bus.

The second type of equipment is a non-intelligent equipment and in the second mode of operation the universal terminal 26 enables a thermal insulation means which opens the circuit of the supply battery if the temperature of the cells exceeds a predetermined threshold.

Figure 3:
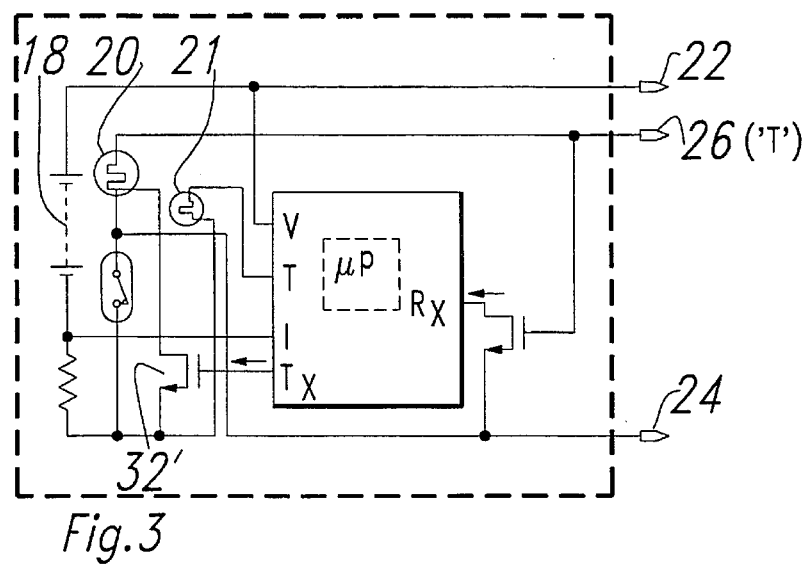
FIG. 3 is a circuit diagram of a second embodiment of the present invention.

The thermal switch 19 is located against the cells and is so connected that the battery current circulates in series through the switch before reaching the supply terminal of the battery. When the temperature of the cells exceeds a predetermined value or when the current exceeds a predetermined value, the thermal switch opens and thus interrupts the passage of the current. An additional multiplexing switch 32, shown in the form of a semiconductor device, is used connected in parallel with the thermistor as shown in FIG. 2 or in series with the thermistor as shown in FIG. 3, in order to provide the universal effect of the "T" terminal.

The supply battery further comprises a circuit 30 having a microprocessor which may control the functions of the battery. The addition of the microprocessor converts the supply battery into an "intelligent supply battery". Such intelligent supply batteries are described in more detail in the applications EP-A-92402955.6 and FR-9306592 filed by the same applicant. The intelligent supply battery may provide a charging control in the course of the recharging of the cells, a charge monitor in the course of the discharging and the charging (for the rechargeable supply battery), display conditions of the battery and perhaps transmit the conditions of the battery to one or more exterior devices or equipment. The microprocessor may be replaced by a microcomputer of the microregister type or an ASIC microchip adapted for the control functions of the management of the battery. The microregister circuit is connected to both the negative and positive terminals and to the "T" terminal and to a multiplexing switch comprising a data input transistor 34 and a data output transistor 32.

Thus, the switching means comprises the microprocessor device 30 and the device including the transistor 32.

When the transistor is off, the "T" terminal acts as if it were directly connected to the thermistor. The supply battery may therefore act as an non-intelligent supply battery and access may be had to the thermistor for measuring the temperature of the battery by measuring its resistance. The microprocessor does not participate in the operation of the supply battery in this embodiment, except for the activities mentioned hereinbefore and described in the applicant's other patent applications. Further, when a high excursion voltage or a constant current is connected to the "T" terminal and the transistor 32 is turned on and turned off so as to deliver an information (in a digital or analog manner), the supply battery may operate in a substantially different manner. At room temperature, the resistance of the thermistor employed in the standard video supply battery is generally 10 kΩ. When the transistor 32 is on, its resistance is generally lower than 50Ω. The high excursion voltage or the constant current of the device is so chosen as to permit making the difference between the logic states 1 and 0 in the operating temperature ranges. When the device generates a signal commanding for example the microprocessor to transmit the state of charge of the battery, which is recognized by the microprocessor, the communication between the microprocessor and the device is established. At the end of the data exchange period, the Nigh excursion voltage or the current is eliminated and the "T" terminal may once again be employed for measuring the temperature of the cells. The same supply battery may be used for both intelligent devices and non-intelligent devices, the intelligent device generally (but not necessarily) initiating the communication through the unit: universal "T" terminal/data bus of the supply battery.

A second temperature sensor 21 is shown in FIG. 2 which is employed in the case of an intelligent supply battery and is connected to a "T" terminal of the circuit having a microprocessor 30. The latter comprises a V terminal connected to the positive pole of the battery and an I terminal connected to the negative pole of the battery. The microprocessor 30 may actuate a display device 35 indicating the state of charge of the supply battery.

In another embodiment shown in FIG. 3, the multiplexing transistor 32' is connected in series with the thermistor 20. In this embodiment, the "on" state of the transistor 32' is the normal implicit mode. The temperature of the cells may be measured through the "T" terminal. Further, if there is a high excursion voltage or a constant current on the "T" terminal which turns the transistor on, the microprocessor may turn the transistor 32' on and off so as to deliver digital information to the device, then invert the "on" state for accepting information or for measuring the temperature of the cells. The multiplexing transistor once again permits the intelligent device to employ the "T" terminal as a data bus, providing in this way an intelligent supply battery or an non-intelligent supply battery if no data exchange is necessary. The switching transistor 32' is shown outside the microregister so as to clearly illustrate the principle; to reduce costs, it may be incorporated within the microregister or the ASIC circuit. The choice of the series or parallel operation of the multiplexing transistor switch is decided in accordance with the implicit state of this transistor, its resistance in the "on" state, the variation in the resistance of the thermistor and other specifications of the circuit configuration.

Clearly, it may be possible to put the invention into practice by the use of different basic circuits. However, so long as the circuit is capable of identifying the type of the device for which the supply battery is intended, the supply battery will be capable of operating in the required manner. The microprocessor may be combined with devices other than a transistor in order to facilitate the practice of the invention. The outer case of the supply battery may be different from that described and shown so long as the three terminals are employed. The same case will however be employed for both intelligent devices and non-intelligent devices.

In the presently-described invention, the case is shown to have three terminals. It will be clear that this number is a minimum condition. There may be embodiments in which further terminals are necessary which are not associated with the operations described hereinbefore. Further, the presently-described arrangement may also be employed with "intelligent supply batteries" other than those described in the applicant's aforementioned patent applications.

I claim:

1. A universal battery pack automatically adjustable for supplying electric power to either (i) a first device requiring first and second power terminals and a third terminal for a thermal-sensing signal or (ii) a second device requiring first and second power terminals and a third terminal for thermal-sensing signals, control signals and data signals, comprising:

a battery having first and second battery terminals;

first and second power terminals respectively coupled to the battery's first and second battery terminals;

a third terminal coupled via a thermal sensor to one of the first or second battery terminals; and a reporting circuit having (i) an input sensing circuit, coupled to the third terminal, for detecting a control signal from the second device, (ii) an output data circuit, normally decoupled from the third terminal, coupled to the battery for generating data signals about the battery condition for the second device, and (iii) a switching circuit coupled and responsive to the input sensing circuit for coupling the output data circuit to the third terminal when the input sensing circuit detects the control signal.

* * * * *